United States Patent [19]

Holman et al.

[11] Patent Number: 4,875,383
[45] Date of Patent: Oct. 24, 1989

[54] DUAL RATIO TRANSMISSION SHIFTER ASSEMBLY WITH NEUTRAL SAFETY SWITCH

[75] Inventors: James L. Holman, Wauseon; George A. Willford, Toledo, both of Ohio

[73] Assignee: Dana Corporation, Toledo, Ohio

[21] Appl. No.: 314,456

[22] Filed: Feb. 23, 1989

[51] Int. Cl.⁴ .................... B60K 20/00; F16H 3/02
[52] U.S. Cl. ........................... 74/473 R; 79/471 XY
[58] Field of Search ............ 74/471 XY, 473 R, 473 P

[56] References Cited

U.S. PATENT DOCUMENTS

| | | | |
|---|---|---|---|
| 2,265,260 | 12/1941 | Argo | 74/471 XY |
| 3,541,877 | 11/1970 | Houk | 74/471 XY |
| 4,422,345 | 12/1983 | Green | 74/471 XY |
| 4,561,325 | 12/1985 | Jester | 74/473 R |
| 4,633,725 | 1/1987 | Jones | 74/473 R |
| 4,679,417 | 7/1987 | Van Cise, Jr. | 74/473 R X |

FOREIGN PATENT DOCUMENTS 1376114  9/1964  France ........................ 74/471 XY

*Primary Examiner*—Peter A. Aschenbrenner
*Attorney, Agent, or Firm*—MacMillan, Sobanski & Todd

[57] ABSTRACT

A shifter assembly for a manual transmission includes a yoke mounted within a shift tower for pivotable movement about a shifting axis. A shift lever is mounted within the yoke for pivotable movement about a selecting axis located above and perpendicular to the shifting axis. The lower end of the shift lever extends into cooperation with conventional shift rails disposed within the transmission. By locating the shifting axis relatively close to the shift rails, a mechanical advantage is provided when moving the shift lever about the shifting axis. Since the selecting axis is located farther away from the shift rails than the shifting axis, the lower end of the shift lever travels farther when the upper end of the shift lever is moved a predetermined distance about the selecting axis than when the upper end of the shift lever is moved about the shifting axis. Thus, the upper end of the shift lever may be a shorter distance than would otherwise be required in order to select one of the shift rails for use, thereby providing a convenient shift pattern. A neutral start switch is mounted in the tower adjacent to the yoke. The neutral start switch is responsive to the pivoting movement of the yoke out of its neutral position for generating an electrical signal.

11 Claims, 2 Drawing Sheets

DUAL RATIO TRANSMISSION SHIFTER ASSEMBLY WITH NEUTRAL SAFETY SWITCH

BACKGROUND OF THE INVENTION

This invention relates in general to transmission shifting mechanisms and in particular to a dual ratio transmission shifter assembly including a integral neutral start switch.

In a typical multiple speed vehicle transmission, a shifter assembly is used for providing a desired one of a plurality of available gear ratios for use between rotatable input and output shafts. A plurality of shift rails are provided within the shifter assembly for accomplishing this gear ratio selection. If, for example, the transmission is capable of five forward gear ratios and one reverse gear ratio, the shifter assembly usually includes three of such shift rails. The shift rails are typically oriented in parallel fashion adjacent to one another, each being supported for longitudinal movement in opposite directions from a central neutral position. Since each of the three shift rails is capable of being moved to two different gear engaging positions, a total of six different gear ratios (five forward, one reverse) can be selected.

The shifter assembly further includes a shift lever for selecting and shifting the shift rails. The upper end of the shift lever extends upwardly to a position where it is easily grasped and manipulated by an operator of the vehicle. The lower end of the gear shift lever extends into the shifter assembly so as to selectively extend into and cooperate with notches formed on the shift rails. By moving the upper end of the shift lever about a first axis of movement (the selecting axis), the operator can move the lower end thereof into a single desired one of the notches formed in the three shift rails. This selecting movement of the shift lever does not move any of the shift rails out of their central neutral positions, but rather selects one of such shift rails for such movement. The operator can then move the selected shift rail out of its central neutral position into one of the two gear engaging positions by moving the upper end of the shift lever about a second axis of movement (the shifting axis). Generally, the shifting axis is transverse to the selecting axis.

SUMMARY OF THE INVENTION

This invention relates to an improved shifter assembly for a manual transmission including an integral neutral start switch. The shifter assembly includes a hollow tower secured to the transmission. A yoke is mounted within the tower for pivotable movement about a first (shifting) axis. A manually operable shift lever is mounted within the yoke for pivotable movement about a second (selecting) axis. The selecting axis is located above and perpendicular to the shifting axis. The lower end of the shift lever extends downwardly through the shifter assembly into cooperation with a plurality of conventional shift rails disposed within the transmission. To provide a selected gear ratio, the shift lever is initially pivoted relative to the yoke about the selecting axis. Consequently, the lower end of the shift lever is moved into a selected one of the shift rail notches. Neither the yoke nor any of the shift rails are moved out of their neutral positions during this initial movement of the shift lever about the selecting axis. Next, the shift lever and the yoke are pivoted about the shifting axis, causing the lower end of the shift lever to move the selected one of the shift rails out of its neutral position. The neutral start switch is mounted in the tower adjcent to the yoke. The neutral start switch is responsive to the pivoting movement of the yoke out of its neutral position for generating an electrical signal indicating that one of the gears of the transmission is engaged. The neutral start switch signal is used to prevent an engine of the vehicle from being started when any of the gears of the transmission are engaged.

It is an object of this invention to provide a dual ratio transmission shifter assembly including an integral neutral start switch.

It is another object of this invention to provide such a shifter assembly which simple and inexpensive in construction and operation.

Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
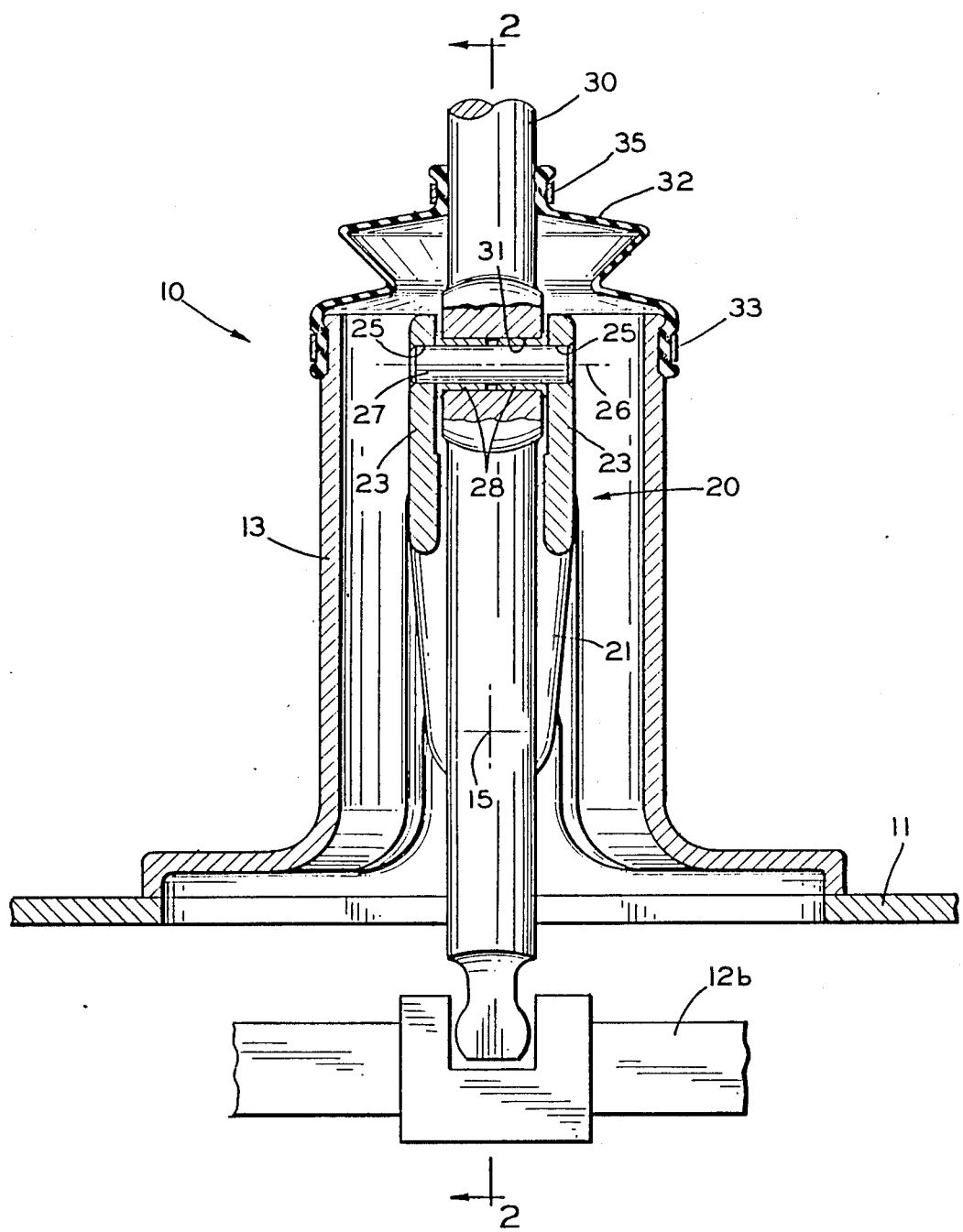
FIG. 1 is a sectional elevational view of a dual ratio transmission shifter assembly in accordance with this invention.

Referring now to the drawings, there is illustrated a transmission shifter assembly, indicated generally at 10, in accordance with the invention. The shifter assembly 10 is mounted on a housing 11 of the transmission. The transmission itself is conventional in the art. Three elongated shift rails 12a, 12b, and 12c are disposed within the transmission housing 11. Each of the shift rails 12a, 12b, and 12c is associated with a gear engaging mechanism (not shown) of the transmission. The gear engaging mechanisms are adapted to selectively engage and connect various gears within the transmission to provide a plurality of available gear ratios between input and output shafts (neither shown) in a conventional manner. When the shift rails 12a, 12b, and 12c, are in their illustrated neutral positions, the respective gear engaging mechanisms disconnect the transmission gears from one another, and no power is transmitted through the transmission. However, as will be described in greater detail below, the shifter assembly 10 can selectively move the shift rails 12a, 12b, and 12c both forwardly and rearwardly from their neutral positions (left and right when viewing FIG. 1) so as to cause the transmission to provide a desired one of a plurality of gear ratios for use between the input and output shafts of the transmission.

Figure 2:
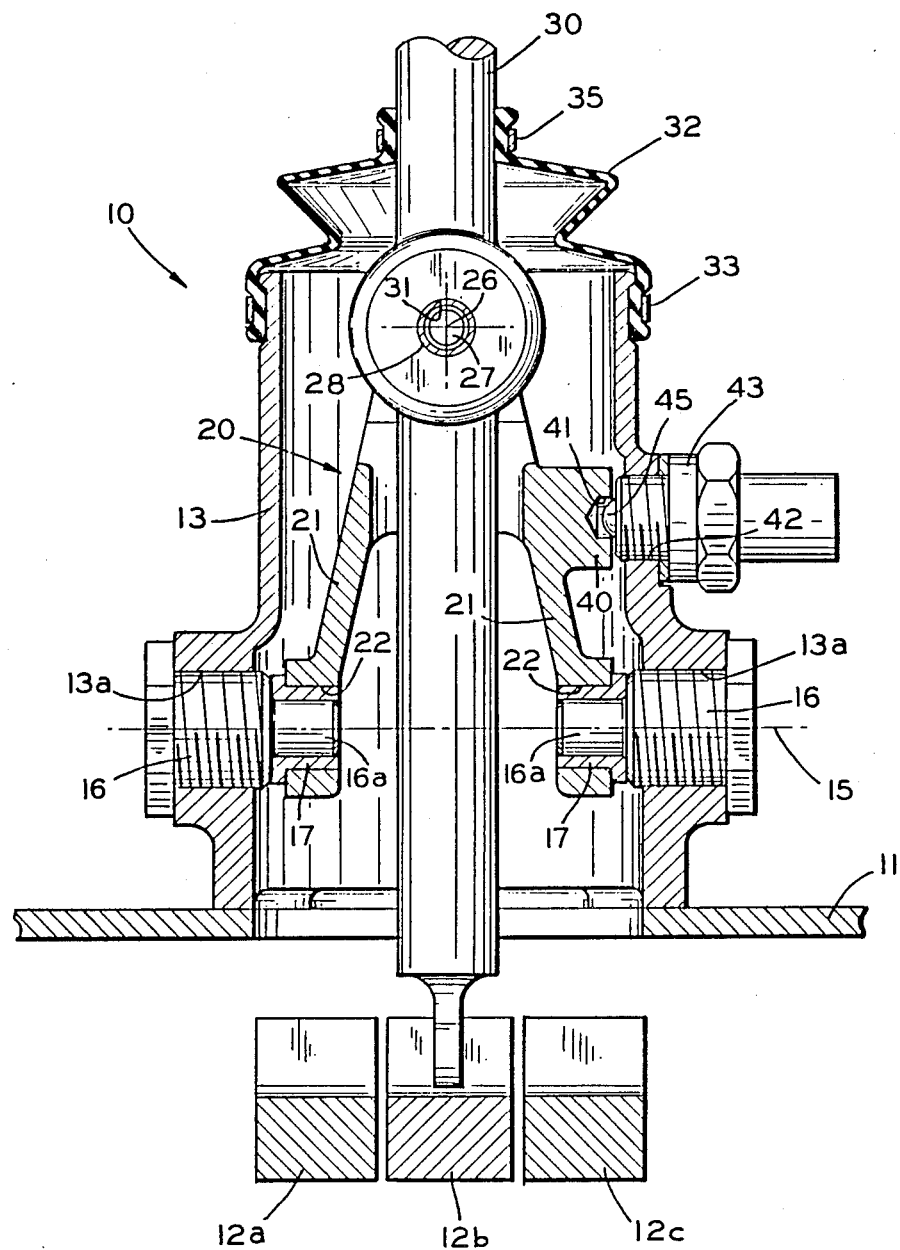
FIG. 2 is a sectional elevational view taken along line 2—2 of FIG. 1.

The shifter assembly 10 includes a tower 13 having a base which is secured to the transmission housing 11 by any conventional means, such as a plurality of threaded fasteners (not shown). As best shown in FIG. 2, the tower 13 is hollow and has a pair of threaded aperatures 13a formed therethrough. The apertures 13a are aligned with one another on opposite sides of the tower 13 near the base thereof. An axis 15 (the shifting axis, as will be explained below) is defined by the apertures 13a. A support member 16 is threaded within each of the apertures 13a. Each of the support members 16 terminates in a cylindrical trunnion 16a extending within the tower 13 along the shifting axis 15. An annular bearing 17 is mounted about each of the cylindrical trunnions 16a.

A shift yoke, indicated generally at 20, is mounted within the tower 13 for pivoting movement about the shifting axis 15. As best shown in FIG. 2, the yoke 20 includes a pair of lower legs 21, each of which has an aperture 22 formed therethrough. The apertures 22 are sized to receive the annular bearings 17 therein such that the yoke 20 is pivotably supported within the tower 13 for movement about the shifting axis 15. As best shown in FIG. 1, the yoke 20 further includes a pair of upper legs 23. An aperture 25 is formed through each of the upper legs 23 which are aligned so as to define an axis 26 therethrough (the selecting axis, as will be explained below). The selecting axis 26 is perpendicular to the shifting axis 15 and is located near an upper end of the tower 13. A pivot pin 27 extends through the apertures 25 between the upper legs 23 of the yoke 20. Between the upper legs 23, a pair of annular bearings 28 are disposed about the pivot pin 27.

A shift lever 30 extends vertically through the shifter assembly 10. An aperture 31 is formed through the shift lever 30. The pivot pin 27 and the annular bearings 28 are received within the aperture 31 such that the shift lever 30 is mounted for pivoting movement relative to the yoke 20 about the selecting axis 26. The upper end of the shift lever 30 extends upwardly out of the tower 13 to a location where it can easily be grasped and manipulated by an operator, as will be discussed below. A flexible boot 32 is connected between the tower 13 and the shift lever 30. The lower end of the boot 32 is attached about the upper end of the tower 13 by a band 33, while the upper end of the boot 32 is attached about the shift lever 30 by a band 35. The boot 32 prevents dirt or other contaminants to enter within the tower 13, while permitting unrestricted movement of the shift lever 30. The lower end of the shift lever 30 extends downwardly through the tower 13 into an area defined by aligned notches formed in each of the shift rails 12a, 12b, and 12c.

As shown in FIG. 2, a boss 40 is formed on one of the lower legs 21 of the yoke 20. The boss 40 extends outwardly from the leg 21 and terminates in a generally flat end surface having a small recess 41 formed in the center thereof. The boss 40 is aligned with an apertures 42 formed through the tower 13. A neutral start switch assembly 43 is retained within the aperture 42. The neutral start switch assembly 43 is conventional in the art and includes a movable plunger 45 adapted to engage the end surface of the boss 40. As will be described in greater detail below, the neutral start switch assembly 43 generates electrical signals in response to movement of the yoke 20.

To operate the transmission, the upper end of the shift lever 30 is initially moved such that it is pivoted about the upper selecting axis 26. As described above, such movement of the shift lever 30 occurs without movement of the yoke 20. Consequently, the yoke 20 remains in its illustrated neutral position, wherein the plunger 45 of the neutral start switch assembly 43 is received in the recess 41 formed in the end surface of the boss 40. By moving the shift lever 30 about the selecting axis 26, the lower end thereof can be moved into a single desired one of the aligned notches formed in the shift rails 12a, 12b, and 12c. This selecting movement of the shift lever 30 does not move any of the shift rails 12a, 12b, and 12c out of their central neutral positions, but rather selects one of the shift rails 12a, 12b, and 12c for such movement.

As is well known, it is desirable to prevent a vehicle engine from being started when the transmission is not in neutral. So long as the plunger 45 of the neutral start switch assembly remains in the recess 41 of the boss 40, the neutral start switch assembly 43 generates an electrical signal indicating that all of the gears of the transmission are disengaged such that no power can be transmitted therethrough, i.e., that the transmission is in neutral. This signal is used by a conventional ignition interlock (not shown) or other means to enable the engine of the vehicle to be started.

To engage the transmission, the selected one of the shift rails 12a, 12b, and 12c can be moved out of its central neutral position by moving the upper end of the shift lever 30 about the shifting axis 15. As described above, such movement of the shift lever 30 also causes pivoting movement of the yoke 20 out of its neutral position. The movement of the yoke 20 causes the recess 41 on the boss 40 to move relative to the plunger 45 of the neutral start switch assembly 43. As a result, the plunger 45 is retracted within the neutral start switch assembly 43. Such retraction causes the neutral start switch assembly 43 to generate an electrical signal indicating that some of the gears of the transmission are engaged, i.e., that the transmission is not in neutral. This signal is used by the ignition interlock to prevent the engine of the vehicle from being started. Thus, it can be seen that the appropriate electrical signals are generated by the neutral start switch assembly 43 by sensing the movement of the yoke 20.

The relative orientation of the shifting axis 15 and the selecting axis 26 as described above is advantageous. By locating the shifting axis 15 near the lower end of the tower 13 and relatively close the shift rails 12a, 12b, and 12c, a mechanical advantage is provided to the operator when moving the shift lever 30 about the shifting axis 15. Such mechanical advantage reduces the amount of effort required to be exerted to move the selected one of the shift rails 12a, 12b, and 12than if the shifting axis 15 were disposed further upwardly within the tower 13. This is important in accounting for comfort or "feel" of the shifter assembly 10 during the shifting process.

Since the selecting axis 26 is located above the shifting axis 15 (i.e., farther way from the shift rails 12a, 12b, and 12c than the shifting axis 15), the same mechanical advantage does not apply to movement of the shift lever 30 about the selecting axis 26. However, the lack of such mechanical advantage is of no consequence, since the lower end of the shift lever 30 does not engage or move any components when it is moved about the selecting axis 26. Furthermore, because the selecting axis 26 is located farther away from the shift rails 12a, 12b, and 12c than the shifting axis 15, the lower end of the shift lever 30 travels farther when the upper end of the shift lever 30 is moved a predetermined distance between about the selecting axis 26 than when the upper end of the shift lever 30 is moved about the shifting axis 15. Thus, the operator does not have to move the upper end of the shift lever 30 as far as would otherwise be required in order to select one of the shift rails 12a, 12b, and 12c for use, thereby providing a more convenient shift pattern.

In accordance with the provisions of the patent statutes, the principle and mode of operation of this invention have been explained and illustrated in its preferred embodiment. However, it must be understood that the invention may be practiced otherwise than as specifically explained and illustrated without departing from its spirit or scope.

What is claimed is:

1. A shift assembly for a transmission having a plurality of movable shift rails comprising:
   a hollow tower having a lower end connected to the transmission;
   a yoke mounted within said tower for pivoting movement relative thereto about a first axis; and
   a shift lever mounted on said yoke for pivoting movement relative thereto about a second axis, said second axis being disposed above said first axis, said shift lever extending into cooperation with the shift rails, said shift lever being movable about said second axis for selecting one of the shift rails for movement and being movable with said yoke about said first axis for moving the selected one of the shift rails.

2. The invention defined in claim 1 wherein said yoke has a pair of lower legs, each having an aperture formed therethrough, and wherein said shifter assembly further includes a pair of support members connected to said tower extending therein, said support members being aligned with said first axis and receiving said lower leg apertures thereon so as to support said yoke thereon for pivoting movement about said first axis.

3. The invention defined in claim 2 wherein said yoke further includes a pair of upper legs, each having an aperture formed therethrough, and wherein said shifter assembly further includes a pivot pin extending through said shift lever into said upper leg apertures, said upper leg apertures being aligned with said second axis so as to support said shift lever on said yoke for movement about said second axis.

4. The invention defined in claim 1 further including switch means mounted in said tower and responsive to movement of said yoke about said first axis for generating an electrical signal.

5. The invention defined in claim 4 wherein said switch means includes a plunger adapted to engage a boss formed on said yoke.

6. The invention defined in claim 4 wherein said switch means is a neutral start switch.

7. A shifter assembly for a transmission having at least one shift rail which is movable from a neutral position to a gear engaging position comprising:
   a hollow tower connected to the transmission;
   a yoke mounted within said tower for pivoting movement relative thereto about a first axis;
   a shift lever mounted on said yoke for pivoting movement relative thereto about a second axis, said shift lever extending into cooperation with the shift rail, said shift lever being movable about said second axis for selecting one of the shift rails for movement and being movable with said yoke about said first axis for moving the selected one of the shift rails; and
   switch means mounted in said tower and responsive to movement of said yoke about said first axis for generating an electrical signal.

8. The invention defined in claim 7 wherein said yoke has a pair of lower legs, each having an aperture formed therethrough, and wherein said shifter assembly further includes a pair of support members connected to said tower extending therein, said support members being aligned with said first axis and receiving said lower leg apertures thereon so as to support said yoke thereon for pivoting movement about said first axis.

9. The invention defined in claim 8 wherein said yoke further includes a pair of upper legs, each having an aperture formed therethrough, and wherein said shifter assembly further includes a pivot pin extending through said shift lever into said upper leg apertures, said upper leg apertures being aligned with said second axis so as to support said shift lever on said yoke for movement about said second axis.

10. The invention defined in claim 7 wherein said switch means includes a plunger adapted to engage a boss formed on said yoke.

11. The invention defined in claim 7 wherein said switch means is a neutral start switch.

* * * * *